April 2, 1929. E. J. CROCKETT 1,707,625
FILM EXPOSURE APPARATUS FOR MOTION PICTURES
Filed April 25, 1927
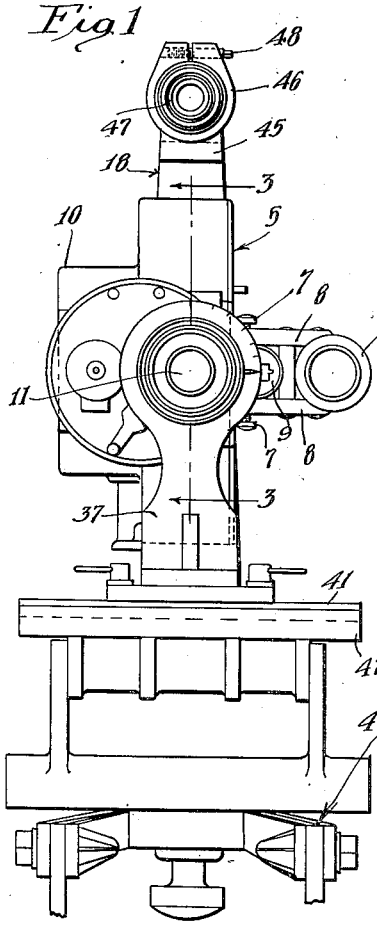
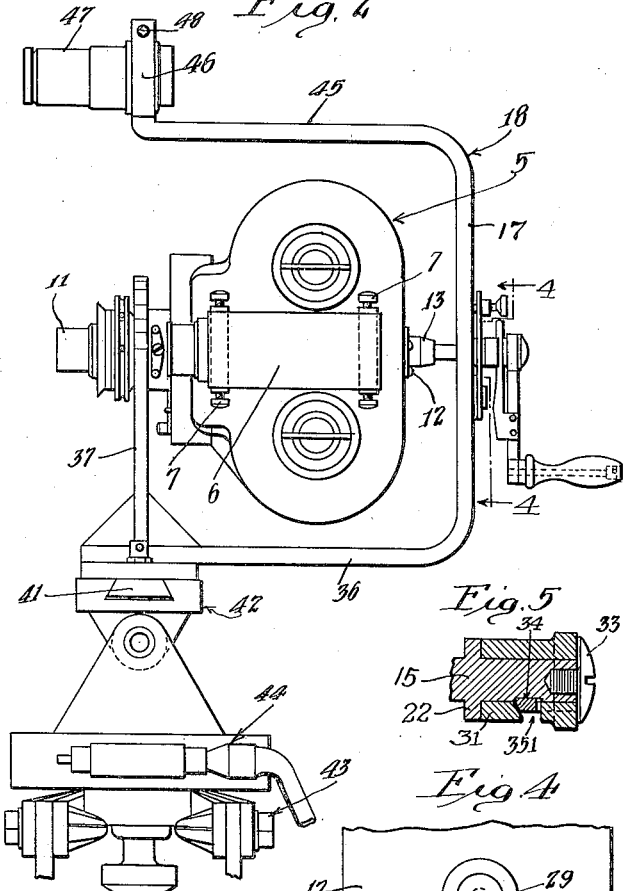
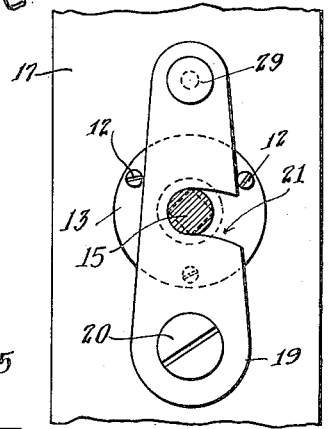
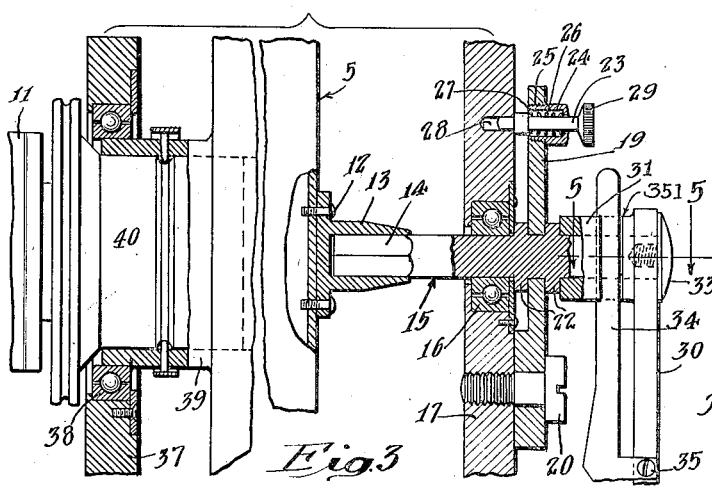

Patented Apr. 2, 1929.

1,707,625

UNITED STATES PATENT OFFICE.

ERNEST J. CROCKETT, OF GLENDALE, CALIFORNIA.

FILM-EXPOSURE APPARATUS FOR MOTION PICTURES.

Application filed April 25, 1927. Serial No. 186,249.

This invention relates, in general, to apparatus for exposing motion picture film and the invention relates more especially to a camera mounted on an axis of rotation coinciding with the axis of the lens of the camera.

An object of the invention is to make it possible to constantly direct the camera lens toward a moving object while rotating the film about the axis of the lens. The invention is useful, for example, in making motion pictures of an airplane while said airplane is in normal flight to make it appear in the series of negative "frames" that the airplane, or other object photographed, looped or turned over while the series of exposures was being made.

Heretofore, to obtain motion pictures representing a looping airplane, a small model of an airplane was constructed and suspended from a suitable support by a cord and the motion picture film was then exposed in a camera pointed at the model and mounted to rotate about the axis of the lens. The camera so constructed could not be operated so that its lens could be constantly directed toward an airplane in actual flight as is possible with the present invention. Accordingly, it will be seen that looping airplane pictures can be more realistically produced by the use of my invention than was heretofore possible.

Another object is simplicity of construction and operation.

Further objects and advantages will appear in the subjoined detailed description.

The accompanying drawings illustrate the invention.

Figure 1 is a front elevation of an apparatus constructed in accordance with the provisions of this invention, a portion of the tripod being broken away to contract the view.

Figure 2 is an elevation of Figure 1 from the right thereof.

Figure 3 is an enlarged broken section on the line indicated by 3—3, Figure 1.

Figure 4 is an enlarged fragmental elevation on the line indicated by 4—4, Figure 2, the shaft being shown in section.

Figure 5 is a sectional detail on the line indicated by 5—5, Figure 3.

Referring to the drawings, there is provided a motion picture camera 5 of any suitable construction. Such camera is well understood in the motion picture art and, therefore, need not be described in detail herein. It is essential, however, that the film and shutter be motor driven and, in this instance, the camera illustrated is of a well known type driven by a spring motor. This camera, as manufactured, is not balanced so as to turn smoothly about an axis passing through the axis of the lens and, accordingly, I provide a counterbalance 6 which, in this instance, is detachably mounted on the camera by thumb screws 7 or their equivalents. The thumb screws 7 are mounted in two pairs of opposed arms 8 of the counterbalance, said arms embracing between them the finder 9 of the camera. The film magazine 10 of the camera illustrated is positioned to one side of the axis of the camera lens 11 and, to balance this eccentric weight, the counterbalance is placed opposite to the film magazine on the other side of the axis of the lens.

The camera 5 is suitably mounted for rotation about the axis of the lens 11 and this mounting may be constructed, for example, as follows: Fixed by screws 12, or their equivalents, to the rear end of the camera is a sleeve 13, having its bore or socket rectangular in cross section. Removably seated in the rectangular bore is the end portion 14 of a shaft which is indicated, in general, by the character 15, said portion 14 being rectangular in cross section to fit the rectangular bore. The portion 14 thus prevents relative turning between the shaft and the camera. The shaft 15 turns in a bearing 16 which is mounted in a standard 17 of a support indicated, in general, by the character 18.

A suitable means is provided to prevent endwise shifting of the shaft 15 away from the sleeve 13 and such means is releasable so that, when desired, the shaft may be withdrawn from the socket to permit the camera being detached for ordinary use. This means, in this instance, is constructed as follows:

An arm 19 is pivoted by a screw 20 on the outer face of the standard 17, and said arm is provided with an arcuate slot 21 opening to one side of said arm. The width of the slot 21 is approximately the same as the diameter of that portion of the shaft 15 that registers with the slot when the arm 19 is in the latching position shown in Figure 4.

When the arm is in said latching position, shoulders 22 on the shaft 15 are on opposite sides of the arm 19, said shoulders bearing against the arm 19 and thus preventing endwise movement of the shaft 15 relative to the standard 17.

A suitable latching means is provided for the arm 19 and, in this instance, said means comprises a pin 23 passing through a spring chamber 24 that is secured to the arm 19, said pin also passing through an opening 25 in said arm 19. Surrounding the pin 23 inside of the spring chamber 24 is a coil spring 26 having one end bearing against a shoulder 27 provided on the pin 23. The shoulder 27 is on the inner end portion of the pin 23 and, thus, the expansive force of the spring 26 tends to force the pin 23 toward the standard 17. When the arm 19 is in position to hold the shaft 15 against endwise movement, the inner end of the pin 23 is held by the spring 26 in a socket 28 provided in the standard 17. The outer end of the pin 23 is provided with a head 29 whereby the operator may easily retract said pin from the socket 28 so as to permit him to swing the arm 19 out of its latching position.

A suitable means is provided to turn the shaft 15 and, in this instance, said means comprises a crank 30 having a tubular hub 31 which engages over the outer end portion of the shaft 15, the inner end of the hub 31 resting against a shoulder 32 on the shaft 15. In order to hold the crank 30 from sliding off of the shaft, there is provided a screw 33 which is threaded into the outer end of the shaft so that the head of said screw engages over the outer face of the hub 31. The crank 30 is held against turning relatively to the shaft 15 by any suitable means and, in this instance, such means comprises a flat spring arm 34 secured by a screw 35, or its equivalent, to the crank 30, said spring arm being accommodated in a slot 351 that extends across the hub 31 and shaft 15. The bottom of the slot is flat and is engaged by the spring arm 34 with sufficient force to cause the shaft 15 to turn with the crank 30 when said crank is operated.

From the foregoing it will be readily seen that not only can the shaft 15 be detached from the sleeve 13, but also that the crank 30 can be detached from the shaft 15.

The supporting frame 18 is provided with a lower horizontal member 36 that connects with the lower end of the standard 17, and said member 36 projects from the base of a standard 37 which carries near its upper end a bearing 38 rotatably supporting a sleeve 39 that constitutes a portion of the camera 5, said sleeve projecting from the front end of said camera. The sleeve 39 carries the lens barrel 40 of the camera as is usual in this type of camera. The lens barrel can be slid in and out of the sleeve 39.

The frame 18 is provided beneath the standard 37 with a slide 41 which is mounted in a tripod head 42 of a tripod, indicated in general by the character 43. The tripod head 42 rotates in a horizontal plane, the mechanism for rotating said head being indicated at 44. The rotating head 42 and mechanism 44 are well understood in the art relating to motion picture tripods and, accordingly, they need not be described in detail herein. It suffices to state that, when the mechanism 44 is operated, the head 42, together with the parts mounted thereon, rotates in a horizontal plane.

The frame 18 also comprises an upper horizontal member 45 that projects forwardly from the upper end of the standard 17. The forward end of the member 45 carries an upwardly extending split clamping collar 46 in which is mounted a finder 47, said finder, preferably, being mounted directly over the camera lens 11 and the axis of said finder being substantially parallel to the axis of the lens 11. The clamping collar 46 is compressed on the finder 47 by a screw 48.

The invention operates as follows:

Assuming, for example, that a series of exposures is to be made of a flying airplane, the mechanism 44 will be operated to point the finder 47 toward the airplane as will be ascertained by the operator looking through said finder while operating said mechanism. This also directs the camera lens toward the airplane and at any desired instant the operator will set the camera motor into operation to expose the film in a manner well understood in the art relating to motion picture cameras. As long as the camera 5 is not rotated about the axis of the lens, the image of the airplane on the film will appear to be moving in a path corresponding to the actual flying path of the airplane. When the operator desires to project onto the film a series of images representing looping of the airplane, he operates the crank 30, thus causing rotation of the camera 5 about the axis of its lens. Thus, on successively exposed "frames" the images of the airplanes will be arranged in different positions about the centers of the "frames".

The foregoing is a description of but one use of the invention and, it will readily be understood without further description, that the invention may be used in numerous ways to produce, so-termed trick pictures.

A great advantage of the invention is that, notwithstanding the fact that a camera of standard construction can be operated in the manner described above, the above described camera can be readily dismounted and used in the ordinary way for making exposures. The dismounting is accomplished as follows:

The latch pin 23 will be released from the standard 17, the arm 19 swung to the left in Figure 4 and the shaft 15 withdrawn from the sleeve 13. While withdrawing the shaft 15, the operator will support the adjacent end of the camera. The operator will then withdraw the lens barrel 40 from the sleeve 39 and he will move the camera rearwardly so as to slide the sleeve 39 from the bearing 38. After the camera is thus dismounted, the screws 7 will be loosened and the counterbalance 6 removed, and the lens barrel will be replaced in the sleeve 39. The camera is now ready for use in the regular way.

From the foregoing it will be seen that some of the results that can be secured with the invention are due, in large measure, to the mounting of the frame 18 upon a rotating tripod head and the mounting of the finder upon the frame 18 so that, irrespective of rotation of the camera 5 about the axis of the camera lens, the finder can be constantly directed toward the moving object that is being photographed.

I claim:

1. An apparatus of the character described comprising a head, means rotatably supporting the head so that it rotates in a horizontal plane, a support mounted on the head, a motor-driven motion picture camera, means rotatably mounting the camera on the support so that the camera rotates about the axis of the camera lens, means to rotate said camera, and a finder mounted on the support.

2. An apparatus of the character described comprising a head, means rotatably supporting the head so that it rotates in a horizontal plane, a motor-driven motion picture camera, a support mounted on the head and provided with standards, bearings in the standards, a shaft mounted in one of the bearings and detachably connected with one end of the camera in alinement with the axis of the camera lens, means to turn said shaft, the camera provided with a sleeve at its other end slidably supported in the other bearing, the camera provided with a lens barrel detachably mounted in said sleeve, and a finder mounted on the support.

3. An apparatus of the character described comprising a head, means rotatably supporting the head so that it rotates in a horizontal plane, a motor-driven motion picture camera, and means rotatably mounting the camera on the head so that the camera rotates about the axis of the camera lens.

4. An apparatus of the character described comprising a head, means rotatably supporting the head so that it rotates in a horizontal plane, a motor-driven motion picture camera having its film magazine eccentric of the axis of the camera lens, a counterbalance detachably mounted on the side of the camera that is opposite to the film magazine, and means rotatably mounting the camera on the head so that the camera rotates about the axis of the camera lens.

5. An apparatus of the character described comprising a motor-driven motion picture camera, a support provided with standards, bearings in the standards, a shaft mounted in one of the bearings and detachably connected with one end of the camera in alinement with the axis of the camera lens, means to turn the shaft, the camrea provided with a sleeve at its other end slidably supported in the other bearing, and the camera provided with a lens barrel detachably mounted in said sleeve.

6. An apparatus of the character described comprising a motor-driven motion picture camera, a support provided with standards, bearings in the standards, a shaft mounted in one of the bearings, means slidably connecting the shaft to one end of the camera and preventing relative rotation between the shaft and camera, means to turn the shaft, means on the standard with which the last mentioned bearing is associated to releasably hold the shaft against endwise movement away from the camera, and the camera provided with a sleeve at its other end slidably supported in the other bearing.

Signed at Los Angeles, Calif., this 18th day of April, 1927.

ERNEST J. CROCKETT.